United States Patent [19]

Easton

[11] 3,725,924
[45] Apr. 3, 1973

[54] INTERMITTENT CW SYSTEM FOR SATELLITE SURVEILLANCE
[75] Inventor: Roger L. Easton, Oxon Hill, Md.
[73] Assignee: The United States of America as represented by the Secretary of the Navy
[22] Filed: July 22, 1970
[21] Appl. No.: 56,031

[52] U.S. Cl. ..............................343/10, 343/100 ST
[51] Int. Cl. ................................................G01s 9/04
[58] Field of Search .........343/100 ST, 10, 12 A, 7.5, 343/5 PD

[56] References Cited
UNITED STATES PATENTS 3,122,741   2/1964   Easton ............................343/100 ST
3,271,763   9/1966   Colby, Jr. ...........................343/12 A Primary Examiner—Benjamin A. Borchelt
Assistant Examiner—G. E. Montone
Attorney—R. S. Sciascia, Arthur L. Branning and James G. Murray

[57] ABSTRACT

An electronic satellite surveillance system wherein transmitters and receivers are located at the same sites and wherein the transmitted signals consist of multifrequency, intermittent, CW electromagnetic energy which is radiated in narrow fan patterns and wherein the receivers include means which allow unambiguous angle and range determination.

8 Claims, 4 Drawing Figures

3,725,924

INVENTOR
ROGER L. EASTON

INVENTOR
ROGER L. EASTON

INTERMITTENT CW SYSTEM FOR SATELLITE SURVEILLANCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In the past decade, due to advances in space technology, there has been a tremendous and ever increasing number of man-made satellites placed in orbit around the earth. For many obvious reasons it became desirable for the government to develop systems which would detect and monitor the orbiting satellites that pass over the continental United States. One of these systems is the Navy Space Surveillance System which is described in U.S. Pat. No. 3,122,741 issued to Roger L. Easton on Feb. 25, 1964 and the related U.S. Pat. No. 3,125,756 issued to Maxime G. Kaufman and Leonard O. Hayden on Mar. 19, 1964. U.S. Pat. No. 3,504,367 issued on Mar. 31, 1970 to Roger L. Easton describes a frequency modulation technique which allows the unambiguous determination of the range of the satellite. As described more fully in these patents, the Navy Space Surveillance System includes transmitters which erect a "fence" or thin wall of continuous CW energy across the southern portion of the continental United States. Orbiting satellites, upon crossing through this "fence", reflect a portion of the CW energy to receiver sites where radio interferometer techniques, implemented by the appropriately spaced antennas and phase measuring apparatus, provide an unambiguous indication of the direction and range of the satellite from the receiver site. To avoid direct coupling, the transmitter and receiver sites are separated by hundreds of miles, a circumstance which greatly increases the land acquisition, construction and maintenance costs.

SUMMARY OF THE INVENTION

The invention here disclosed and described is an improvement on the prior systems for detecting and monitoring orbiting satellites, and of the Navy Space Surveillance System in particular, and while embracing all of the advantages of the prior systems provides for a large reduction in those costs which relate to site acquisition, construction and maintenance. To attain this advantageous cost reduction, the invention contemplates an electronic system of satellite surveillance in which transmitters and receivers are located at the same sites, thereby reducing the number of necessary sites and obviously producing a sizable reduction in the cost of site acquisition, construction and maintenance. To avoid direct coupling between the transmitter and receiver, the invention contemplates the intermittent radiation of multi-frequency energy in a narrow fan or "fence" pattern with reception occurring during the transmitter "off" period. As in prior systems, the receivers include a plurality of antennas and phase measuring apparatus which allows the unambiguous determination of the direction and range of the satellite.

OBJECTS OF THE INVENTION

It is, therefore, an object of the invention to provide an improved satellite surveillance system.

Another object is to reduce the cost of satellite surveillance systems by providing an electronic system for satellite surveillance wherein transmitters and receivers are located at the same sites, thereby reducing the cost of site acquisition, construction and maintenance.

Yet another object is to provide an improved satellite surveillance system wherein multi-frequency, intermittent, CW energy is radiated in narrow fan patterns and the receivers include phase measuring apparatus and a plurality of antennas which allow unambiguous range and angle determination.

DESCRIPTION OF THE DRAWINGS

The exact nature of this invention as well as other objects and advantages thereof will be readily apparent from consideration of the following specification relating to the annexed drawing in which.

DESCRIPTION OF THE INVENTION

Figure 1:
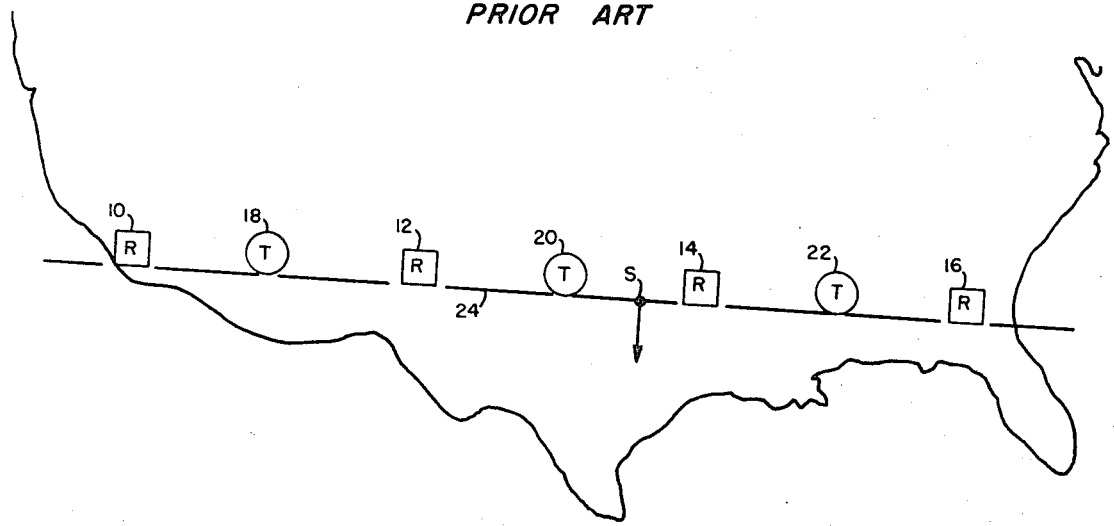
FIGS. 1 and 2 show the prior art.

Referring now to the drawings, wherein like reference numerals and letters designate like or corresponding parts throughout the several views. The reader is cautioned that the drawings should not be construed as being more than merely representative of practical structure. Obviously much of the drawings and many of the features of the invention have been dimensionally distorted, symbolically shown and otherwise extremely simplified for the purpose that the disclosure of the invention might be presented in a manner having both clarity and conciseness of illustration and description.

Figure 2:
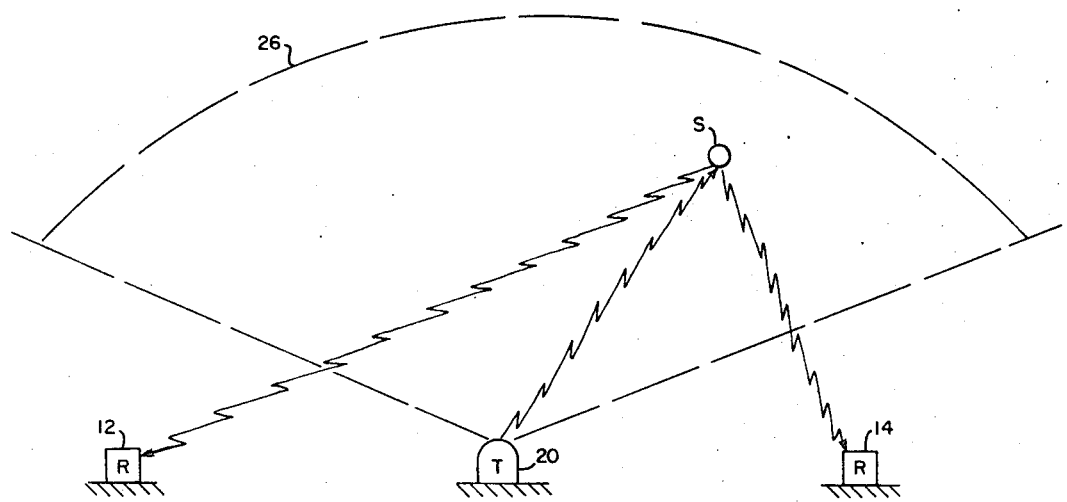

In order to bring into better focus the advantages of the present invention, it will be helpful to discuss prior space surveillance systems. FIGS. 1 and 2 illustrate the Navy Space Surveillance System, which is typical of the more advanced prior systems. As shown, four receiving stations 10, 12, 14 and 16 are located across the southern part of the continental United States. Each receiving station includes a plurality of antennas (that are uniquely spaced for the purposes of the interferometer techniques which are employed) and phase and frequency measuring devices, which can either be at the site or at remote computing centers.

Transmitters 18, 20 and 22 are alternately located with the receivers 10, 12, 14 and 16, all of which are substantially on a straight line. To avoid direct coupling to the receiving stations, the transmitters 18, 20 and 22 are separated from the receiving stations by, at least, several hundred miles. The transmitters 18, 20 and 22 cooperatively function to erect a thin "fence" of CW electromagnetic energy, this fence 24 being formed by the individual fan shaped radiation patterns of the transmitters, such as the pattern 26 of transmitter 20 which is shown in FIG. 2. It has been found that improved results are obtainable if the CW fence 24 includes a plurality of frequencies which are coherently related.

The thickness of fence 24 and the speed of satellite S (shown in a polar North-South orbit) are such that satellite S is typically in the fence for only a relatively short period of time, i.e., approximately a second. During this approximately one second interval, the CW transmission from transmitter 20 is reflected from satellite S to receiving stations 12 and 14 where well known techniques are employed to obtain information concerning the orbital parameters of the satellite S. For example, interferometer techniques are employed to obtain intersecting vectors from sites 12 and 14 which define the location of satellite S as it crossed the fence 24.

Figure 3:
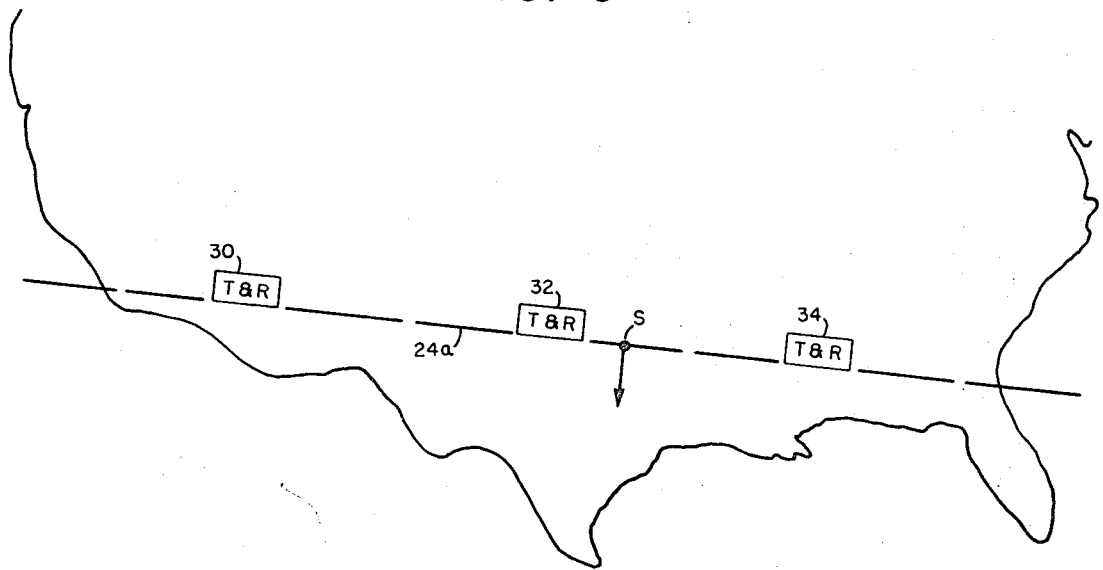
FIGS. 3 and 4 illustrate the improvement of the prior art as embodied in this invention.
Figure 4:
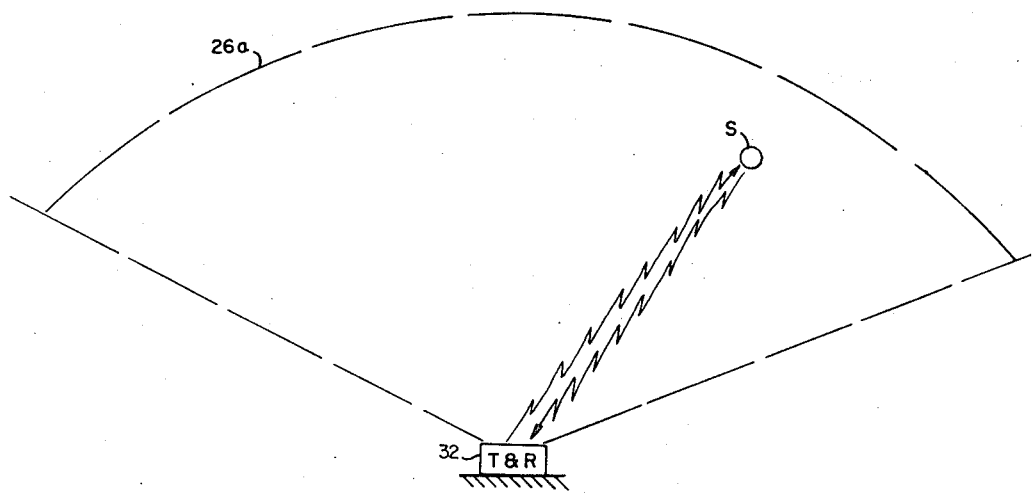

The reader is now referred to FIGS. 3 and 4 which illustrate the present invention as located in the environment of FIGS. 1 and 2, although obviously the invention is not limited to such a location. In contrast to the seven sites of the prior system of FIG. 1, the present invention requires only the three sites 30, 32 and 34 which are shown in FIG. 3 as being located on a straight line across the southern continental United States. Each of the sites 30, 32 and 34 include both transmitting and receiving equipments which are controlled to have coincident patterns of intermittent operation, i.e., the transmitters at all sites are intermittently concurrently "on" and "off" and the receiving equipments at all three sites are intermittently concurrently "off" and "on", i.e., the receiving equipments at the sites 30, 32 and 34 are all controlled to be concurrently "off" while transmission is occurring and "on" in the absence of transmission.

At sites 30, 32, and 34 the transmitting equipments radiate fan shaped patterns 26A which are (in some ways) very similar to the patterns 26 which are radiated by the transmitters 18, 20 and 22 of FIG. 1 in that the patterns 26A include a plurality of frequencies which are coherently related and cooperatively function to erect a thin "fence" 24A of electromagnetic energy across the southern portion of the continental United States. However, in contrast to the continuous CW energy of the prior art fence 24 and patterns 26 shown in FIG. 1, the fence 24A and the individual patterns 26A are intermittent CW with a typical duty cycle of 50 percent, i.e., "on" and "off" periods of equal duration.

The "on" period of fence 26A and, of course, the transmitters at the sites 30, 32 and 34, is preferably related to the round trip time of the radiation (signal) to the maximum desired range of the system, typically an "on" period of approximately 10 milliseconds for a desired maximum range of 1000 miles. If the satellite S transverses the fence 24A at the maximum range of 1000 miles, the full 10 millisecond signal reflected by satellite S will be processed by the receiver at the site, i.e., site 32 as illustrated in FIG. 4. When satellite S is at a shorter range, only a latter portion of the reflected signal will be processed since the unprocessed earlier portion of the reflected signal will arrive while transmission is occurring and the receiving equipment is turned off. In other words, the length of the processed signal is indicative of the range of satellite S, the shorter the processed signal the shorter the distance to the satellite. The usual interferometer, doppler, phase measuring and other techniques are also applicable for obtaining the orbital parameters of the satellite S.

It will, of course, be apparent to those skilled in the electronic arts that other techniques of intermittent transmission can also be used. For example, the transmitters at sites 30, 32 and 34 may be operated with 50 percent duty cycles and on-off periods in sequences of 1, 2, 3 etc. milliseconds. Because of interpretive difficulties these other techniques have not been found to be as desirable as the previously described 10 millisecond pulse technique.

By now the apparatus and operation of the present invention is, no doubt, evident to the reader. As contemplated, the invention embodies a satellite surveillance system located at one or more sites, each site including transmitting and receiving apparatus. As shown in FIG. 3, three such sites 30, 32 and 34 comprise a system for surveillance of satellites passing over the continental United States. The transmitting and receiving apparatuses at the sites are operatively coordinated to intermittently erect (in a direction perpendicular to the expected paths of satellites) a thin fence of CW electromagnetic energy which includes frequency components that are coherently related and to intermittently be capable of receiving energy reflected from a satellite S passing through the fence. Typically the transmitting and receiving apparatuses at all of the sites operate together on 50 percent duty cycles, i.e., all of the transmitters radiating fan shaped patterns 26A to form the fence 24A, typically for a period of 10 milliseconds, during which time the receiving apparatuses at the sites are inhibited from processing the energy being radiated. The radiated energy is, of course, quite strongly directly coupled into the antennas of the receiving equipments. When the transmitting equipments are turned off, the receiving equipments at the various sites are made operative to process the energy reflected by a satellite S passing through the fence 24A. This processing is contemplated as including interferometer techniques which utilize appropriately spaced antennas to determine the direction of the satellite and modulations ranging techniques as disclosed in U.S. Pat. No. 3,504,367 issued on Mar. 31, 1970 to Roger L. Easton. The distance of the satellite S is roughly determined by by measuring the duration of the signal processed, i.e., the full 10 millisecond signal is processed when the satellite S is at the maximum system range of approximately 1000 miles while smaller portions of the signal are processed when the satellite S is at a lesser distance as it passes through the fence 24A. Precise ranging is obtained by the modulation techniques of the mentioned patent. It is also contemplated that other known techniques are used to determine other orbital parameters of the satellite S.

There has been disclosed an improved satellite surveillance system wherein transmitters and receivers are located at the same sites, thereby reducing the cost of site acquisition, construction and maintenance and wherein multi-frequency, intermittent, CW energy is radiated in narrow fan patterns and the receivers include phase measuring apparatus and a plurality of antennas which allow unambiguous range and angle determinations. Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. Improved apparatus for detecting satellites in orbit around the earth, comprising:

transmitting means which operate on substantially a 50 percent duty cycle and function during the "on" portion of said cycle to radiate coherent multifrequency intermittent continuous wave electromagnetic energy in a pattern having dimensions which are relatively very small in the expected direction of the path of said satellite and relatively very large in the directions perpendicular to said path and receiving means which are operative only during the "off" portion of said cycle for receiving energy reflected by a satellite passing through said radiated pattern and for determining from said reflected energy the range, in accordance with the duration of the reflected wave energy received during the "off" portion of the cycle, and direction of said satellite.

2. The apparatus of claim 1 wherein said transmitting means and said receiving means are located at the same site.

3. The apparatus of claim 1 wherein the duration of said "on" portion of said transmitting means 50 percent duty cycle is approximately equal to the round trip time of electromagnetic energy to the maximum range at which said improved apparatus can detect satellites.

4. The apparatus of claim 3 wherein said transmitting means and said receiving means are located at the same site.

5. An improved electronic system for detecting satellites in orbit around the earth, comprising:

a plurality of sites located on a line that is substantially straight, each site including transmitting means and receiving means;

each of said plurality of transmitting means operating on approximately 50 percent duty cycles which are substantially coincident and cooperatively functioning during the "on" portion of said duty cycle to radiate a fence of coherent multifrequency intermittent continuous wave electromagnetic energy which is substantially parallel to said line and which has dimensions that are relatively very small in the expected direction of the path of said satellite and relatively very large in the direction perpendicular to said path and each of said plurality of receiving means operating only during the "off" portion of said duty cycle for receiving energy reflected by a satellite passing through said fence and for determining from said reflected energy the range, in accordance with the duration of the reflected wave energy received during the "off" portion of the cycle, and direction of said satellite.

6. The system of claim 5 wherein the duration of said "on" portion of said duty cycle is approximately equal to the round trip time of electromagnetic energy to the maximum satellite detection range of said system.

7. The system of claim 6 wherein said receiving means utilize interferometer techniques to determine the direction of said satellite.

8. The system of claim 7 wherein the energy radiated by said transmitting means includes different frequency components which are coherently related.

* * * * *